United States Patent Office 3,308,081
Patented Mar. 7, 1967

3,308,081
STABLE AQUEOUS DISPERSIONS OF COPOLYMERS OF ETHYLENE AND UNSATURATED AMINES
Dietrich Glabisch, Leverkusen, Germany, assignor to Farbenfabriken Bayer Aktiengesellschaft, Leverkusen, Germany, a German corporation
No Drawing. Filed Mar. 12, 1962, Ser. No. 179,242
Claims priority, application Germany, Mar. 21, 1961, F 33,464
7 Claims. (Cl. 260—29.6)

The present invention relates to stable aqueous dispersions of ethylene copolymers which are free from usual emulsifying agents as well as a process for producing the same.

It is known to polymerise ethylene in aqueous emulsions in the presence or absence of emulsifiers with the aid of compounds which form free radicals, i.e. initiators, such as inorganic or organic peroxides or azo compounds, the process being carried out under special conditions, or alternatively to subject ethylene to copolymerisation, if necessary in the presence of other suitable components. The known processes of this type have a number of disadvantages.

If ethylene is subjected to homopolymerisation in aqueous emulsion without the addition of emulsifiers, it is necessary to use at least 10% and in most cases about 20%, calculated on the polymer, of an initiator such as an alkali metal persulphate in order to obtain emulsions which are sufficiently stable for storage. Moreover, the emulsions obtained in this way have a very low solids content, generally below 10% and usually only about 5%. These products prepared without the use of emulsifiers are not really high molecular weight polyethylenes but low molecular weight wax-like products. Owing to the presence of high concentrations of alkali metal persulphate initiator in the polymerisation process, the products have incorporated in them —$SO_3^\ominus$— and —$OSO_3^\ominus$— groups which impart detergent and emulsifying properties to these compounds. The corresponding fatty alcohols may be isolated from these sulphonated wax-like products by suitable methods.

For homopolymerising ethylene in aqueous emulsion in the presence of emulsifiers, at least 10 to 20%, calculated on the polymer, of a water-soluble initiator and a strongly alkaline medium are required.

It is also known that ethylene may be polymerised in emulsion either alone or in the presence of small quantities of water-soluble vinyl compounds such as for example vinyl sulphonic acids, with the aid of small quantities of water-insoluble initiators such as organic peroxides or azo compounds. In this case, the presence of emulsifiers is necessary. Emulsions or dispersions prepared solely by means of the usual emulifiers have the disadvantage that coatings made from them are hydrophilic owing to their content of commonly used emulsifiers and therefore have an undesirable tendency to re-emulsification.

It has now been found that stable aqueous emulsions of ethylene copolymers having a relative high solids content and which are free from usual emulsifiers may be obtained if ethylene is polymerised (a) at pressures above 100 atmospheres above atmospheric pressure (b) with the aid of water-soluble free radical forming compounds in amounts of 0.1–3.0% by weight, calculated on the amount of polymer, (c) in the presence of 0.1–10%, calculated on the polymer of an amine containing one polymerisable carbon-carbon double bond. By amines containing one polymerisable double bond obviously the amines per se as well as their quaternisation products or the corresponding amine salts are understood.

The usual emulsifiers in this context are taken to be low molecular weight substances which, owing to their special structural features, are capable of micellar formation in aqueous solution and are able to disperse in a more or less stable manner substances which are insoluble or difficultly soluble in water. The above-mentioned structural features comprise at least one strongly hydrophobic molecular group, for example a long chained hydrocarbon radical containing, for example, 15 to 20 carbon atoms and at least one strongly hydrophilic group such as, for example, the sulphonate-, sulphate- or quaternary ammonium group.

Amines suitable for the process of the present invention and containing one polymerisable carbon-to-carbon double bond include a large variety of primary, secondary and tertiary amines. It is preferable to use strongly basic amines, which may be of aliphatic, cycloaliphatic or heterocyclic nature. The nitrogen atom of the amine group may itself belong to a heterocyclic ring, as is the case in piperidine, piperazine or morpholine.

Individual examples of suitable polymerisable amines are allyl amines and vinyl amines such as allyl amine itself, allylmethyl amine, allyl-dimethyl amine, 4-vinylbenzyldimethyl amine, 4-allylbenzyl-dimethyl amine and methylbenzyl-allyl amine as well as N-vinyl and N-allyl nitrogen heterocyclic compounds such as for example N-vinyl-piperidine, N-vinyl-morpholine, N-allyl-piperidine and N-allyl-N'-methylpiperazine.

Another group of suitable polymerisable amines corresponds to Formula I

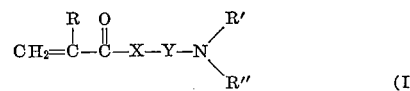

(I)

wherein represents

R hydrogen or a saturated alkyl radical having from 1 to 3 carbon atoms,

R' and R" may be identical or not and represent an organic radical such as an aliphatic saturated monovalent hydrocarbon radical, a cycloaliphatic hydrocarbon radical or a bivalent saturated organic radical which forms together with the attached nitrogen atom a saturated heterocyclic ring system, X —NH— or —O— or —S—, and wherein Y stands for a bivalent saturated hydrocarbon radical which may be of aliphatic or cycloaliphatic nature and which contains not more than 8 carbon atoms. Said hydrocarbon radical may be straight chained or branched and furthermore may be interrupted by one or more heteroatoms, for example urea groups or urethane groups.

The following are examples in which X represents an oxygen bridge:

$CH_2=CH-CO-O-CH_2-CH_2-NH_2$ $CH_2=CH-CO-O-CH_2-CH_2-NH-CH_3$ $CH_2=CH-CO-O-CH_2-CH_2-N(CH_3)_2$

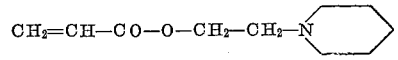

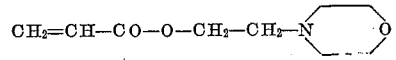

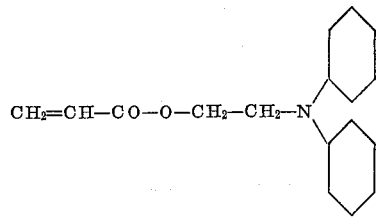

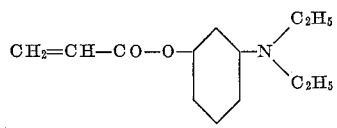

In the following examples, X in Formula I represents a —NH— bridge:

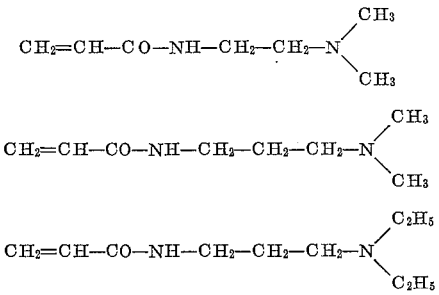

Instead of the acrylic derivatives given above, methacrylic derivatives may be used.

The said acrylic- or methacrylic acid derivatives may be prepared in known manner by the Schotten-Baumann reaction or, where X represents an oxygen bridge, by ester interchange of acrylic- or methacrylic esters of lower alcohols with amine alcohols, for example by the method disclosed in U.S. Patent No. 2,138,763.

Acrylic acid derivatives containing urea groups, for example the reaction products of acrylic acid or methacrylic acid ethyl ester-β-isocyanates and polyamines with at most one secondary or primary amino group and at least one tertiary amino group, represent a special group of compounds corresponding to Formula I. An example of this is a reaction product of methacrylic acid ethyl ester-β-isocyanate and dimethylaminopropylamine of the following composition:

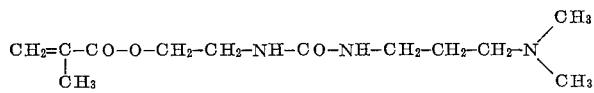

All these amines may be used either as such or in the form of their salts or quaternary ammonium compounds. The said amines may be converted to their salts by means of inorganic or organic acids such as hydrochloric acid, sulphuric acid, phosphoric acid and acetic acid, benzenesulphonic acid or toluenesulphonic acid. The agents suitable for converting amines to their quaternary compounds are those normally used for the purpose, such as dialkylsulphates or alkyl halides, especially alkyliodides.

Amine salts for the purposes of this invention include also the so-called inner salts, i.e. compounds with amphoteric ions, provided they contain a polymerisable carbon-to-carbon double bond. Examples of these compounds with amphoteric ions are the allyl ester of glutamic acid

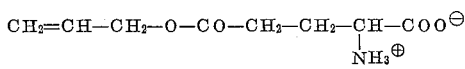

or methacrylic ornithine

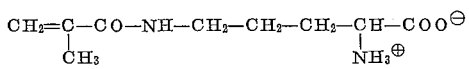

The betaines of Formula II below are both amphoteric ion compounds and quaternary ammonium compounds, as required by the invention. These compounds are represented by the following formula

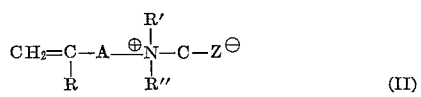

(II)

in which

R represents a hydrogen or a saturated alkyl radical having 1 to 3 carbon atoms, R' and R'' may be identical or not and represent an organic radical from the group of an aliphatic, saturated hydrocarbon radical, a cycloaliphatic hydrocarbon radical and a bivalent saturated organic radical which forms together with the attached nitrogen a saturated heterocyclic ring system.

A represents a member of the group of —CH$_2$—, —CO—O—B—, —CO—NH—B— and —CO—S—B— group.

B represents a saturated aliphatic hydrocarbon radical having not more than 8 carbon atoms, which may be a straight chained or branched one, Z may represent —COO$^\ominus$, —SO$_3^\ominus$ or —OSO$_3^\ominus$.

The following are examples of compounds of formula II

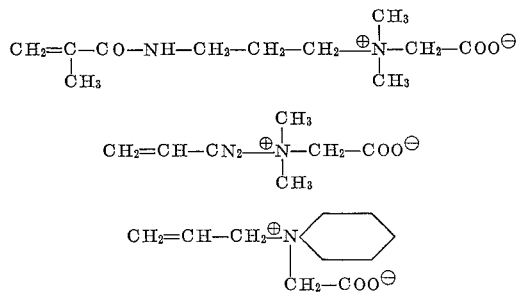

Betaines of this kind are obtained by reacting halogenated alkali metal acetate with the corresponding tertiary amines in accordance with U.S. Patent No. 2,935,493. Examples of sulphobetaines which may be obtained in an analogous manner are the following:

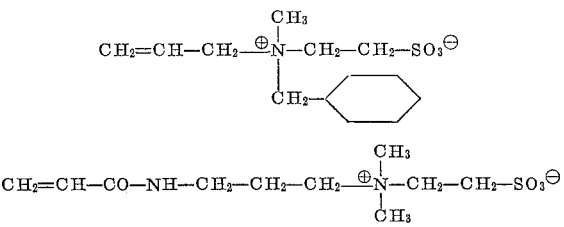

All the abovementioned amines or salts or ammonium compounds are added in quantities of 0.1 to 10% by weight, preferably 1 to 5% by weight, calculated on the amount of the polymer obtained. One may of course add mixtures of these amines.

According to the process of the invention, other compounds containing ethylenic double bonds and capable of copolymerisation, particularly vinyl compounds such as vinyl ester, vinyl halides, acrylic acid derivatives and aromatic vinyl compounds may be subjected to copolymerisation with the abovementioned components, and they are preferably present in a proportion of 15% of the copolymer.

The polymerisation process may be initiated according to the invention by water-soluble substances which form free radicals, preferably inorganic peroxy compounds such as potassium-, sodium- or ammonium-peroxy disulphates, perborates, hydrogen peroxides and the like. The abovementioned water-soluble per-compounds may be used in the form of redox systems, i.e. in combination with reducing agents, in a manner known per se. Suitable reducing agents are, for example, sodium pyrosulphite or bisulphite, sodium formaldehyde-sulphoxylate and triethanolamine.

In this method, it is quite sufficient to use 0.1 to 3% of initiator (calculated on the quantity of polymer) to produce stable latices with a high solids content. In contrast to this, other processes require up to about 20% of initiator, calculated on the polymer, and wax-like products are formed. The polymerisation in accordance with the above method should be carried out substantially within a pH-range of 5 to 9.

When alkali metal peroxy disulphates are used, the hydrogen ion concentration of the reaction medium may change during the course of the polymerisation in the direction of shifting the pH to the left, and for this reason yields may often be increased by adding buffers to the reaction medium to prevent the pH falling to produce a strongly acid medium. Mixtures of primary and secondary potassium phosphate or borax are suitable buffers for this purpose.

Owing to the neutral or weakly acid pH which is adjusted either before polymerisation begins by adding acids or during polymerisation by the formation of acids resulting from the thermal decomposition of for example ammonium peroxy disulphate, the amine which is incorporated in the copolymer is converted into strongly polar cationic ammonium groups.

It has now surprisingly been found that these ammonium groups are capable of completely emulsifying the marcromolecules of the copolymer and in addition do not effect any re-emulsification of the copolymer isolated.

The polymerisation process according to the present invention is carried out at excess ethylene pressures of above 100 atmospheres, preferably between 200 and 500 atmospheres above atmospheric pressure. The polymerisation temperature depends on the initiator or initiator system used. The temperatures are usually below 100° C., preferably between 50 and 85° C. The polymerisation time varies with the reaction conditions and generally lies between 8 and 18 hours.

The emulsions and dispersions prepared in accordance with the invention may be used for many different purposes. For example, by allowing the emulsions to dry out at room temperature or even at higher temperatures, for example between 100 and 150° C., one obtains opaque films of very good flexibility and distinguished by their hydrophobic properties. Owing to the absence of a low molecular weight emulsifier, the coatings or impregnating media prepared with the aid of the above-described emulsions are hydrophobic and therefore do not re-emulsify. These emulsions may therefore advantageously be used for impregnating textiles, paper, leather and other materials.

In cases where coagulation is desired, this may be achieved by using strong mineral acids. Colourless polymers are thereby obtained and these are found on analysis to be composed of ethylenes modified by the incorporation of small quantities of the copolymerisable amines which have been added. The coagulated polymers may be pressed in the softened state above 100° C. to form plates and other moulded products.

The products formed in accordance with the invention by coagulation of the emulsions with acids or by drying may be insoluble in organic solvents such as petroleum ether, heptane, benzene, toluene, xylene, decalin, tetralin and chlorinated hydrocarbons even at elevated temperatures or soluble only to the extent that they swell slightly. These cross-linked products have the advantage that the corresponding emulsions may be used to form dressings or coatings on substrates such as leather, textiles, paper, etc., which are not only hydrophobic as mentioned above but are also extremely resistant to solvents and have excellent adhesion on polar materials.

The parts given in the following examples are parts by weight except where otherwise indicated.

*Example 1*

A solution of 0.57 part of allylamine and 3 parts of potassium peroxy disulphate in 850 parts of distilled water and 100 parts of an aqueous buffer solution, pH 8.1, containing 16,575 grams $KH_2PO_4$ and 0.681 gram $KH_2PO_4$ per litre is placed in a high pressure stainless steel autoclave with stirrer. The pH of the whole solution is 8.5. The autoclave is closed, washed three times with a quantity of ethylene corresponding to 10 atmospheres excess pressure, and then filled with ethylene to an excess pressure of about 70 atmospheres. After heating to 75° C. for 30 minutes, the pressure rises to about 130 atmospheres above excess pressure. Polymerisation is carried out with vigorous stirring for 18 hours at 75° C., ethylene being added hourly to keep the ethylene pressure at 200 atmospheres. (This polymerisation technique is also used in the following examples.)

The total amount of ethylene subsequently added corresponds to the amount required to compensate for a fall in pressure of 400 atmospheres. After cooling and release of pressure, 1034 parts of a finely divided white emulsion of pH 5 with a solids content of 17% by weight is obtained. The polymer contains 0.09% by weight of nitrogen, corresponding to complete copolymerisation of the allylamine. Only about 2% by weight of initiator calculated on the polymer were used.

*Example 2*

Under the same reaction conditions as in Example 1, a solution of 2.19 parts of sulphuric acid salts of γ-dimethylaminopropyl-methacrylamide, 3 parts of potassium peroxydisulphate, 100 parts of buffer solution (as in Example 1), and 850 parts of distilled water is polymerised at 75° C. for 15 hours, maintaining an excess ethylene pressure of 200 atmospheres. 1032 parts of an emulsion free from coagulate and containing 18.6 % by weight of solids are obtained.

*Example 3*

A solution of 2.28 parts of methacrylamidopropyl-dimethylcarboxymethyl-ammonium betaine (prepared by the process disclosed in U.S. Patent 2,935,493), 3.0 parts of potassium peroxy disulphate, 100 parts of buffer solution (as in Example 1) and 850 parts of distilled water are polymerised as in Example 1 at 180 atmospheres ethylene pressure, and 1051 parts of a latex free from coagulate, having a pH-value of 5 and containing 20% by weight of solids are obtained after 18 hours. The polymerisation temperature was maintained at 80° C.

*Example 4*

A solution of 3 parts of methacryl-oxethyl-β-trimethyl-ammonium chloride, 3 parts of potassium peroxy disulphate, 100 parts of buffer solution (as in Example 1) and 850 parts of distilled water are polymerised for 10 hours at 75° C. and 200 atmospheres ethylene pressure under the reaction conditions as in Example 1. The initial pH is 8.1. A stable latex with 20% by weight solids content is obtained.

*Example 5*

A mixture of 4.7 parts of

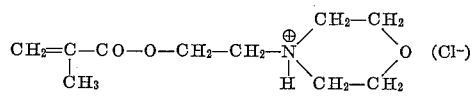

3 parts of ammonium peroxy disulphate, 70 parts of 1/10 molar secondary potassium phosphate solution, 30 parts of 1/10 molar primary potassium phosphate solution and 850 parts of distilled water are polymerised for 12 hours at 70° C. and 200 atmospheres ethylene pressure as in Example 1, starting with a pH of 7.2. The resulting product is a coagulate-free latex, pH 5, 21% by weight of solids content.

*Example 6*

Cotton fabric is treated by the Foulard process with an emulsion containing 6 grams of solids per litre, prepared according to one of the above Examples, and the dressed fabric is dried at 95° C. This improves the feel of the fabric, giving it more body, as well as increasing the wear resistance. The effect is not impaired after washing five times.

*Example 7*

A solution of 3 parts of γ-dimethylamino-methacrylamide, 3 parts potassium peroxy disulphate, 2 parts of sodium pyrosulphite, 100 parts of buffer solution (as in Example 1) and 850 parts of distilled water are polymerised at 65° C. and an excess ethylene pressure of 250 atmospheres by the method described in Example 1, using a reducing system, and 1060 parts of a coagulate-free latex, pH 5, with a solids content of 20.5% by weight are obtained after 15 hours.

*Example 8*

A solution of 11.4 parts of methacrylamide propyldimethyl-ammonium betaine (prepared according to U.S. Patent 2,935,493), 3 parts of potassium peroxy disulphate, 20 parts vinyl acetate, 100 parts of buffer solution (as in Example 1) and 850 parts of distilled water are polymerised as in Example 1 at 80° C. and at 200 atmospheres excess ethylene pressure. 1030 parts of a coagulate-free latex of pH 4 and solids content 15% by weight are obtained after 13 hours.

What I claim is:
1. A process for the production of a stable latex of ethylene copolymers having a high solids content which are free from usual emulsifiers, which comprises polymerizing ethylene in an aqueous medium (a) at pressures above 100 atmospheres, (b) with the aid of a water-soluble substance capable of forming free radicals in an amount of from 0.1 to 3% by weight calculated on the quantity of polymer, (c) in the presence of 0.1 to 10% by weight, calculated on the polymer, of an amine containing one polymerizable carbon-to-carbon double bond, said amine being selected from the group consisting of a primary amine, a secondary amine and a tertiary amine.

2. The process of claim 1 wherein said water-soluble substance capable of forming free radicals is employed in form of a redox system.

3. The process of claim 1 wherein said polymerisation is carried out at a pH value of from 5 to 9 and at temperatures between 50 and 85° C.

4. The process of claim 1 wherein said amine containing one polymerisable carbon-to-carbon double bond corresponds to Formula I

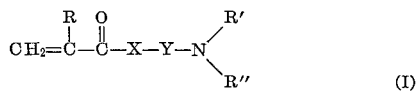

(I)

where R represents a member selected from the group consisting of hydrogen and a saturated alkyl radical of from 1 to 3 carbon atoms, R' and R'' may represent an organic radical being selected from the group consisting of an aliphatic saturated hydrocarbon radical, a cycloaliphatic hydrocarbon radical and a bivalent saturated organic radical which forms together with the attached nitrogen atom a saturated heterocyclic ring system, wherein X represents a member selected from the group consisting of —NH—, —O— and —S—, and wherein Y stands for a bivalent saturated organic radical having not more than 8 carbon atoms.

5. A stable latex of an ethylene polymer which is free from the usual emulsifiers, prepared according to the process of claim 4.

6. The process of claim 1 wherein said amine containing one polymerisable carbon-to-carbon double bond is an N-allyl amine.

7. The process of claim 1 wherein said amine containing one polymerisable carbon-to-carbon double bond is an N-vinyl amine.

References Cited by the Examiner

UNITED STATES PATENTS

| | | | |
|---|---|---|---|
| 2,396,785 | 3/1946 | Hanford | 260—88.1 |
| 2,883,370 | 4/1957 | Price | 260—88.1 |
| 3,108,979 | 10/1963 | Le Fevre et al. | 260—29.6 |

FOREIGN PATENTS 578,584  7/1946  Great Britain.

OTHER REFERENCES

Penning et al.: German application 1,114,320, printed September 28, 1961 (KL 39c 25/01), 2 pages spec., 5 examples.

MURRAY TILLMAN, *Primary Examiner.*

L. J. BERCOVITZ, *Examiner.*

J. J. NORRIS, W. J. BRIGGS, *Assistant Examiners.*